(12) United States Patent
Kato et al.

(10) Patent No.: US 6,497,147 B2
(45) Date of Patent: Dec. 24, 2002

(54) ACTUATOR FOR OSCILLATOR

(75) Inventors: Manabu Kato, Aichi-ken (JP); Hideya Kurachi, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 7 days.

(21) Appl. No.: 09/809,223

(22) Filed: Mar. 16, 2001

(65) Prior Publication Data

US 2001/0022106 A1 Sep. 20, 2001

(30) Foreign Application Priority Data

Mar. 17, 2000 (JP) ........................................ 2000-077092
Mar. 16, 2001 (JP) ........................................ 2001-076275

(51) Int. Cl.$^7$ ............................ G01P 9/04; G01C 19/56
(52) U.S. Cl. ................................. 73/504.12; 73/504.14
(58) Field of Search ...................... 73/504.12, 504.02, 73/504.04, 504.13, 504.14, 504.15, 504.16

(56) References Cited

U.S. PATENT DOCUMENTS

| | | | |
|---|---|---|---|
| 5,635,638 A | 6/1997 | Geen | |
| 6,250,156 B1 | * 6/2001 | Seshia et al. | ............ 73/504.12 |
| 6,267,008 B1 | * 7/2001 | Nagao | ..................... 73/504.12 |

FOREIGN PATENT DOCUMENTS

| | | |
|---|---|---|
| JP | 61-102518 | 5/1986 |
| JP | 4-88809 | 8/1992 |
| JP | 2000-28364 | 1/2000 |
| WO | WO 95/34798 | 12/1995 |

* cited by examiner

Primary Examiner—Helen Kwok
(74) Attorney, Agent, or Firm—Sughrue Mion, PLLC

(57) ABSTRACT

An actuator for an oscillator which is capable of minimizing the fluctuation of the detection error of the oscillation condition of an electrostatic driven oscillator and shortening rise time of the oscillation amplitude of the electrostatic driven oscillator during starting. An actuator oscillates a drive frame and a detecting frame in the X-direction by outputting the drive signal to an electrode and detects the displacement of the drive frame in the X-direction as the displacement signal. The actuator generates a direct-current voltage component of the drive signal controlled to be increased or decreased based on the detected displacement signal and an alternating voltage component of the drive signal having a constant amplitude to maintain the constancy of the oscillation amplitude of the drive frame based on the detected displacement signal. During starting, the actuator generates an alternating voltage component of the drive signal having a larger amplitude compared to at normal operation condition.

12 Claims, 14 Drawing Sheets

Fig.19                                   RELATED ART

ACTUATOR FOR OSCILLATOR

This application is based on and claims priority under 35 U.S.C. § 119 with respect to Japanese Application No. 2000-077092 on Mar. 17, 2000 and to Japanese Application No. 2001-076275 filed on Mar. 16, 2001.

FIELD OF THE INVENTION

The present invention generally relates to an actuator for an oscillator. More particularly, the present invention pertains to an actuator for an oscillator for oscillating electrostatic driven type oscillators provided with angular rate sensors.

BACKGROUND OF THE INVENTION

A schematic illustration of related art actuators for an oscillator for oscillating electrostatic driven oscillators provided with an angular rate sensor is shown in FIG. 19. As shown in FIG. 19, a signal for the displacement of the electrostatic driven oscillator caused by the oscillation in a driving direction is outputted from a driving direction displacement detecting electrode 81 to a displacement signal detecting portion 82.

The displacement signal outputted to the displacement signal detecting portion 82 is synchronously detected at a timing synchronized to the displacement in a driving direction in a synchronous detection circuit 83 to be outputted to an amplitude adjuster 84 as oscillation amplitude data.

Simultaneously, the displacement signal outputted to the displacement signal detecting portion 82 is outputted to the amplitude adjuster 84 after being phase-shifted by approximately 90 degrees in a 90 degree phase shifter 85. By means of the phase shift of the displacement signal by approximately 90 degrees via the 90 degree phase shifter 85, an alternating voltage component of the drive signal having phase-contrast by approximately 90 degrees relative to the displacement signal is generated in the amplitude adjuster 84 to facilitate the oscillation of the electrostatic driven type oscillator.

The oscillation amplitude data outputted to the amplitude adjuster 84 is compared with a predetermined amplitude value in the amplitude adjuster 84. When the oscillation amplitude data is smaller than the predetermined amplitude value, an alternating voltage component of the drive signal having increased amplitude is generated (incremental adjustment). On the other hand, when the oscillation amplitude data is larger than the predetermined amplitude value, the alternating voltage component of the drive signal having decreased amplitude is generated (decremental adjustment). The amplitude adjustment of the alternating voltage component of the drive signal in the foregoing manner is performed for controlling the amplitude driving force of the oscillator to have constant amplitude in the driving direction of the oscillator. The alternating voltage component of the drive signal in which the amplitude is adjusted in the foregoing manner is outputted to an adder 86.

In the adder 86, a drive signal is generated by incorporating the alternating voltage component of the drive signal in which the amplitude is adjusted and the direct-current voltage component of the drive signal having a predetermined value. The drive signal generated in this manner is supplied to a drive electrode 87 fixed on a substrate. When the voltage of the drive electrode of the oscillator side is grounded (GND), the oscillator is oscillated to have constant amplitude in the driving direction by the oscillation of the electrostatic attraction generated to be proportional to the second power of the drive signal between the oscillator and the drive electrode 87.

Generally, electrostatic driven oscillators are oscillated by a drive signal consisting of the alternating voltage component and the direct-current voltage component supplied thereto. The electrostatic driven oscillators are oscillated by the oscillation of the electrostatic attraction generated proportional to the second power of the drive signal between the electrostatic driven oscillator and a drive electrode. The displacement of the electrostatic driven type oscillator according to the oscillation in a driving direction is detected as a displacement signal. The generation of the drive signal is controlled by an amplitude adjusting means to maintain the constancy of the oscillation amplitude of the electrostatic driven oscillator in a driving direction based on the detected displacement signal. By controlling the generation of the drive signal, the oscillation driving force of the electrostatic driven oscillator is controlled to maintain the constancy of the oscillation amplitude of the electrostatic driven oscillator in a driving direction.

The alternating voltage component of the drive signal is a cause of the noise of the displacement detecting signal because of the approximately same frequency with the displacement detecting signal. Thus, the alternating voltage component of the drive signal becomes a main cause of the detection error of the oscillation condition of the electrostatic driven oscillator. When an angular rate is detected during oscillation of the electrostatic driven oscillator applied to an angular rate sensor, the alternating voltage component causes a lag in the detected output.

When the amount of the noise derived from the alternating voltage component of the drive signal is stable, the detection error of the oscillation and the lag of the detected output of the angular rate maintain an approximately fixed level. When the detection error of the oscillation and the lag of the detected output of the angular rate maintain an approximately fixed level, they can be easily corrected. Therefore, when the amount of the noise derived from the alternating voltage component of the drive signal is stable, it is easy to correct the error. However, when the increase or decrease of the alternating voltage component of the drive signal is adjusted for maintaining the oscillation amplitude in a driving direction to be constant while the Q factor of the electrostatic driven oscillator in a driving direction fluctuates due to the change of the electrostatic driven oscillator due to the passage of time and the change in the environmental temperature, the amount of the noise mixed in the displacement detecting signal fluctuates. Thus, the detection error of the oscillation condition of the electrostatic driven type oscillator and the lag of the detected output of the angular rate are fluctuated by the increase or decrease of the alternating voltage component of the drive signal.

In order to minimize the fluctuation of the lag of the detecting output of the angular rate and the detection error of the oscillation condition of the electrostatic driven oscillator, it was proposed to control the oscillation drive force of the electrostatic driven oscillator to maintain the constancy of the oscillation amplitude of the electrostatic oscillator in a driving direction by increasing or decreasing only the direct-current voltage component while maintaining the constancy of the amplitude of the alternating voltage component of the drive signal.

Thus, as shown in a schematic illustration of FIG. 20, the displacement according to the oscillation of the electrostatic driven oscillator in a driven direction is outputted to a displacement signal detecting portion 92 from a driving direction displacement detecting electrode 91 as a displacement signal.

The displacement signal outputted to the displacement signal detecting portion 92 which is synchronously detected at a timing synchronized to the displacement in the driving direction in a synchronous detecting circuit 93 is outputted as the oscillation amplitude data to an oscillation adjuster 94. The oscillation amplitude data outputted to the amplitude adjuster 94 is compared to a predetermined amplitude value in the amplitude adjuster 94. When the oscillation amplitude data is smaller than the predetermined amplitude value, the direct-current voltage component of the drive signal is adjusted to be increased. On the other hand, when the oscillation amplitude data is larger than the predetermined amplitude value, the direct-current voltage component of the drive signal is decreased. The direct-current voltage component of the drive signal is adjusted to control the oscillation drive force of the electrostatic drive oscillator in order to maintain the constancy of the oscillation amplitude of the electrostatic drive oscillator in driving direction. The direct-current voltage component of the drive signal generated in the foregoing manner is outputted to the adder 95.

Simultaneously, part of the displacement signal outputted to the displacement signal detecting portion 92 is outputted to the alternating voltage component generating portion 97 after being phase-shifted by approximately 90 degrees via a 90 degree phase shifter 96. In the alternating voltage component generating portion 97, the alternating voltage component of the drive signal having the same frequency as the displacement signal, is phase-shifted approximately 90 degrees to the displacement signal, and having a constant amplitude is generated. The amplitude of the alternating voltage component of the drive signal is large enough to oscillate the oscillator at the resonant frequency. By shifting the phase of the alternating voltage component of the drive signal by approximately 90 degrees to the displacement signal, the oscillator can be driven at the most effective resonant frequency point which makes the oscillation of the oscillator easy. The alternating voltage component of the drive signal generated in the aforementioned manner is outputted to the adder 95.

In the adder 95, the adjusted direct-current voltage component Vdc of the drive signal and the alternating voltage component of the drive signal having the constant amplitude are added to generate an incorporated drive signal. The incorporated drive signal generated in the foregoing manner is supplied to the drive electrode 98. By the oscillation of the electrostatic attraction generated between the oscillator and the drive electrode 98 proportional to the second power of the drive signal, the oscillator is oscillated to maintain the constancy of the oscillation amplitude in the driving direction.

In the aforementioned actuator for an oscillator, in order to reduce the amount of the noise mixed in the displacement signal derived from the alternating voltage component of the drive signal, the alternating voltage component of the drive signal is predetermined to have a relatively small amplitude. However, in case the oscillation drive force of the oscillator is controlled only by the increase or decrease of the direct-current voltage component of the drive signal, a sufficient oscillation drive force cannot be obtained at the start at which the maximum drive force is needed compared to the force needed in a normal operation because the adjustment range of the direct-current voltage component is restricted by the capacity of the power supply voltage. Accordingly, it takes time to rise until the oscillation reaches a predetermined oscillation condition. This tendency is more remarkable in an oscillation having a higher Q-factor.

SUMMARY OF THE INVENTION

In light of the foregoing, it is an object of the present invention to provide an actuator for an oscillator to minimize unfavorable conditions such as the change of the detection error under the oscillation of an electrostatic driven oscillator.

It is a further object of the present invention to provide an actuator for an oscillator which is capable of shortening the rise time of the oscillation amplitude of an oscillator at the start.

To attain the above objects, the following technical means are provided with the actuator for an oscillator of the present invention which includes an oscillator driving means for oscillating an electrostatic driven oscillator by outputting a drive signal thereto, a displacement detecting means for detecting a displacement according to the oscillation of the electrostatic driven oscillator as a displacement signal, and an amplitude adjusting means for controlling the generation of the drive signal outputted from the oscillator driving means based on the detected displacement signal. The amplitude adjusting means comprises an alternating voltage component generating means for generating an alternating voltage component of the drive signal having a first amplitude in a normal operation and for generating the alternating voltage component of the drive signal having a second amplitude which is larger than the first amplitude at the start and a direct-current voltage component generating means for generating a direct current voltage component of the drive signal controlled to be increased or decreased based on the detected displacement signal. During the normal operation, the oscillation amplitude of the electrostatic driven oscillator is adjusted to be constant by controlling the oscillation force of the electrostatic driven oscillator based on an incorporated signal consisting of the direct-current voltage component and the alternating voltage component having a first amplitude. At the start, the oscillation amplitude of the electrostatic driven type oscillator is increased by providing a larger oscillation drive force to the electrostatic driven oscillator based on the incorporated drive signal consisting of the direct-current voltage component and the alternating voltage component having a second amplitude.

A second aspect of the technical means of the actuator for an oscillator of the present invention involves an alternating voltage component generating means comprised of an alternating voltage component generating portion for generating the alternating voltage component of a predetermined amplitude and an amplifying portion for generating the alternating voltage component of the drive signal having a first amplitude and the alternating voltage component of the drive signal having a second amplitude by amplifying the alternating voltage component of the predetermined amplitude by different amplification ratio in accordance with the distinction between a normal operation condition and a starting condition.

A third aspect of the technical means of the actuator for oscillator of the present invention involves an alternating voltage component generating means comprised of a first signal route for generating the alternating voltage component of the drire signal having a first amplitude, a second signal route for generating the alternating voltage component of the drive signal having a second amplitude, and a switching portion for switching the first signal route and the second signal route in accordance with the distinction of the normal operation condition and the starting condition.

A fourth aspect of the technical means of the actuator for oscillator of the present invention involves an oscillator driving means for oscillating the electrostatic driven oscillator by outputting a drive signal thereto, a displacement detecting means for detecting a displacement according to an oscillation of the electrostatic driven oscillator as a displacement signal, and an amplitude adjusting means for controlling the generation of the drive signal outputted from the oscillator driving means based on the detected displacement signal. The amplitude adjusting means is comprised of an alternating voltage component generating means for generating the alternating voltage component of the drive signal having a constant amplitude by phase-shifting and amplifying the displacement signal by a first amplification ratio at the normal operation and for generating the alternating voltage component of the drive signal by amplifying the displacement signal by a second amplification ratio which is larger than the first amplification ratio at a starting condition and is comprised of a direct-current voltage component generating means for generating the direct-current voltage component of the drive signal controlled to be increased or decreased based on the detected displacement signal. The oscillation amplitude of the electrostatic driven oscillator is adjusted to be constant by controlling the oscillation drive force of the electrostatic driven oscillator based on an incorporated signal consisting of the direct-current voltage component and the alternating voltage component having a constant amplitude amplified by the first amplification ratio at the normal operation. The oscillation amplitude of the electrostatic driven oscillator is increased by driving the larger oscillation drive force relative to the electrostatic driven oscillator based on an incorporated drive signal consisting of the direct-current voltage component and the alternating voltage component amplified by the second amplification ratio at the start.

A fifth aspect of the technical means of the actuator for an oscillator of the present invention involves the normal operation condition and the starting condition being distinguished by the passage of time after the start.

A sixth aspect of the technical means of the actuator for an oscillator of the present invention involves the normal operation condition and the starting condition being distinguished by the comparison between a predetermined amplitude at a start condition and the oscillation amplitude of the electrostatic driven oscillator detected based on the displacement signal.

A seventh aspect of the technical means of the actuator for an oscillator of the present invention involves the normal operation condition and the starting condition being distinguished by the comparison between the direct-current voltage component and a predetermined voltage at the start condition. The oscillation amplitude is set to be proportional to the oscillation frequency.

According to the first through the fourth aspects of the technical means, the oscillation adjusting means generates the incorporated drive signal consisting of the direct-current voltage component controlled to be increased or decreased based on the detected displacement signal and the alternating voltage component having a first amplitude by the alternating voltage component generating means and a direct-current voltage component generating means at the normal condition. Based on the incorporated drive signal, the oscillation drive force of the electrostatic driven oscillator is controlled to maintain the constancy of the oscillation amplitude of the electrostatic driven oscillator in driving direction. Thus, even when the Q factor of the electrostatic driven oscillator in a driving direction fluctuates due to the change of the electrostatic driven oscillator by the passage of time and the change of the environment temperature, only the direct-current voltage component of the drive signal is increased and decreased to maintain the constancy of the alternating voltage component (amplitude). Accordingly, even when the Q factor of the electrostatic driven oscillator in a driving direction fluctuates due to the passage of time and the change of the environment temperature, the amount of the noise in the displacement signal deriving from the alternating voltage component of the drive signal is kept stable. This helps the correction of detection error changes as long as the noise amount is stable by keeping the fixed level.

On the other hand, the oscillation adjusting means generates the incorporated drive signal consisting of the direct-current voltage component controlled to be increased or decreased based on the detected displacement signal and the alternating voltage component having the second amplitude which is larger than the first amplitude by the direct-current voltage component generating means and the alternating voltage component generating means at the start. Based on the incorporated drive signal, the oscillation amplitude of the electrostatic driven type oscillator is increased by driving the larger oscillation drive force relative to the electrostatic driven oscillator. Accordingly, the rise time of the oscillation amplitude of the electrostatic driven oscillator at the start is shortened.

Particularly, according to the fourth aspect of the technical means of the present invention, the alternating voltage component of the drive signal is generated only by phase-shifting and amplifying the displacement signal irrespective of the normal operation condition or the starting condition. When the oscillation amplitude of the electrostatic driven oscillator is kept stable, the alternating voltage component of the drive signal having the constant amplitude is generated only by phase-shifting and amplifying the displacement signal based on the oscillation of the electrostatic driven oscillator. Accordingly, the circuit structure of the alternating voltage component generating means is simplified compared to generating the alternating voltage component of the drive signal separately.

According to the fifth aspect of the technical means of the present invention, the distinction between the normal operation condition and the starting condition can be performed with simpler circuit structure based on the passage of time after the start.

According to the sixth aspect of the technical means of the present invention, the distinction between the normal operation condition and the starting condition can be performed more precisely by comparing the predetermined amplitude at the start and the oscillation amplitude which shows the actual oscillation condition of the electrostatic driven oscillator.

According to the seventh aspect of the technical means of the present invention, the distinction between the normal operation condition and the starting condition can be performed with a simpler structure and more precisely by comparing the direct current voltage component and the predetermined voltage at the start.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

First Embodiment

Figure 1:
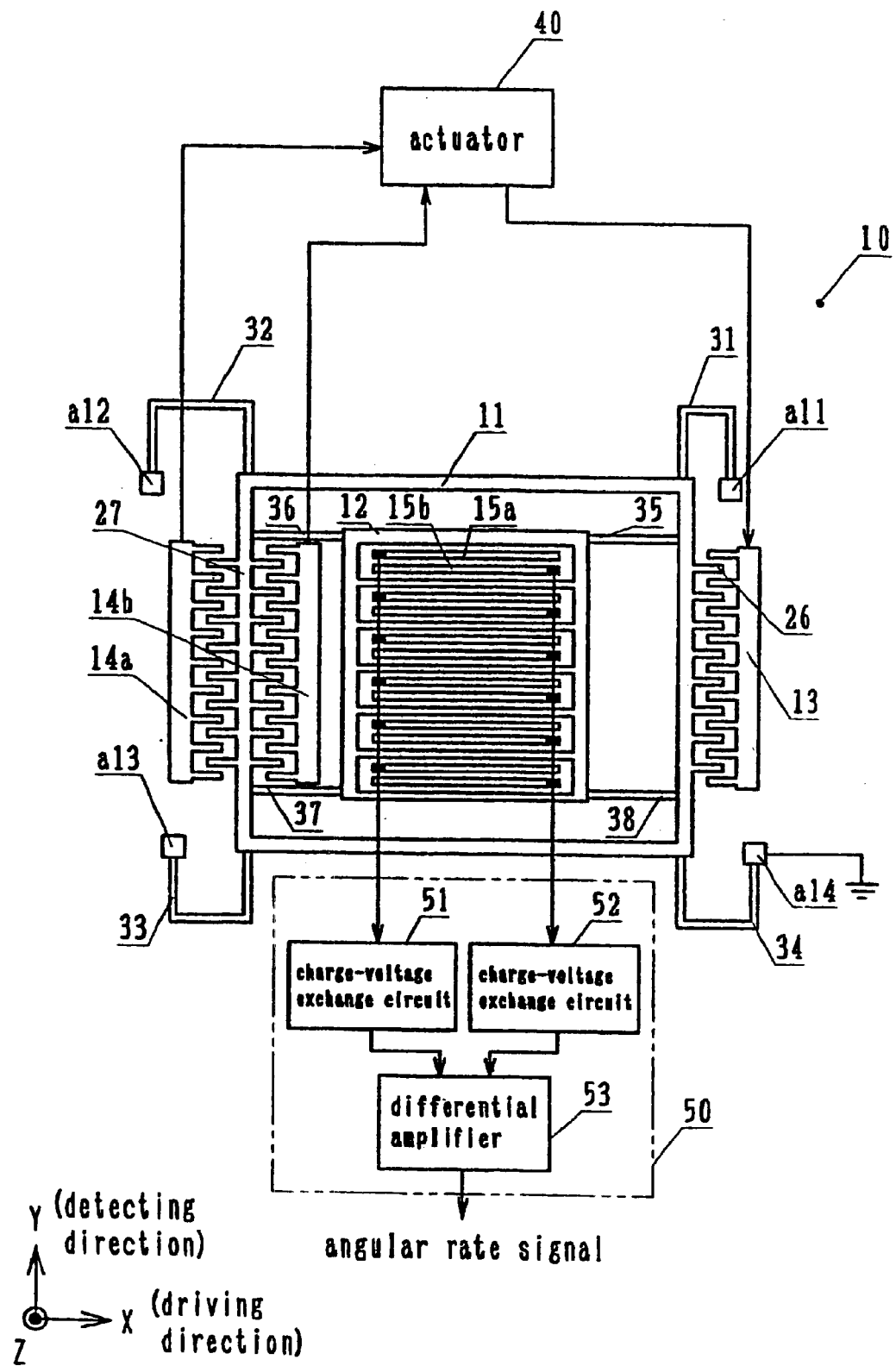
FIG. 1 is a schematic view of an angular rate sensor according to a first embodiment of the present invention.

FIG. 1 illustrates an angular rate sensor with an actuator for an oscillator according to the present invention. A silicon substrate 10 is provided with an insulating layer made from a silicon nitride membrane or a silicon oxidized membrane on the surface thereof. Also provided are a drive frame 11 and a detecting frame 12 functioning as oscillators, a drive electrode 13, first and second driving direction displacement detecting electrodes 14a, 14b, first and second angular rate detecting electrodes 15a, 15b, and first, second, third and fourth floating anchors a11, a12, a13, a14, all of which are provided on the substrate 10 and are formed from polysilicon with an added impurity to make the oscillator electrically conductive. The drive electrode 13, the driving direction displacement detecting electrodes 14a, 14b, the angular rate detecting electrodes 15a 15b, and the floating anchors a11–a14 are adhered to the silicon substrate 10.

An approximately rectangular-shaped drive frame 11 is provided with a tine-shaped drive side movable electrode 26 extended in the outer X-direction and tines thereof are arranged in parallel in the Y-direction on the right side as shown in FIG. 1. A tine-shaped drive detecting side movable electrode 27 extends inwardly and outwardly in the X-direction and the tines thereof are arranged in parallel in the Y-direction on the left side of FIG. 1. The electrostatic attraction generated between the drive side movable electrode 26 and the drive electrode 13 is periodically fluctuated by the drive signal supplied to the drive electrode 13 to generate the oscillation of the drive frame 11. The drive detecting side movable electrode 27 detects the oscillation generated by the fluctuation of the electrostatic capacitance between the drive detecting side movable electrode 27 and the driving direction displacement detecting electrodes 14a, 14b caused by the oscillation of the drive frame 11. The isolation between the oscillator, each electrode, and a circuit is achieved by polysilicon wiring and an electrode pad formed on the silicon substrate 10 provided with an insulating layer on the surface thereof and having the same conductivity as the oscillator.

Four corners of the drive frame 11 are connected to the floating anchors a11–a14 via first, second, third, and fourth spring beams 31, 32, 33, 34 made of conductive polysilicon and extended outwardly in the Y-direction to provide high flexure of the oscillator in the X-direction. The drive frame 11 and the spring beams 31 through 34 are formed to float over the silicon substrate 10, for instance, by semiconductor lithographic processing. The spring beams 31 through 34 have the same width and length as one another. As a material for the oscillator and electrodes, other conductive materials such as single crystal Si metal may be used.

The detecting frame 12 having a shorter width and length compared to the drive frame 11 is formed in approximately rectangular shape. The inside of the detecting frame 12 is equally divided into a plurality of spaces, six as shown in FIG. 1 by bridging beams which are extended in the X-direction. Four corners of the detecting frame 12 are each connected to conductive polysilicon spring beams 35, 36, 37, 38 extending in the X-direction with each spring beam connected to the inside of the drive frame 11 to provide high flexure of the oscillator in the Y-direction since the spring beams 35, 36, 37, 38 may be flexed. The detecting frame 12 and the spring beams 35 through 38 are formed to float over the silicon substrate 10, for instance, by semiconductor lithographic processing. The spring beams 35 through 38 are formed to have the same width and the length as one another.

Figure 2:
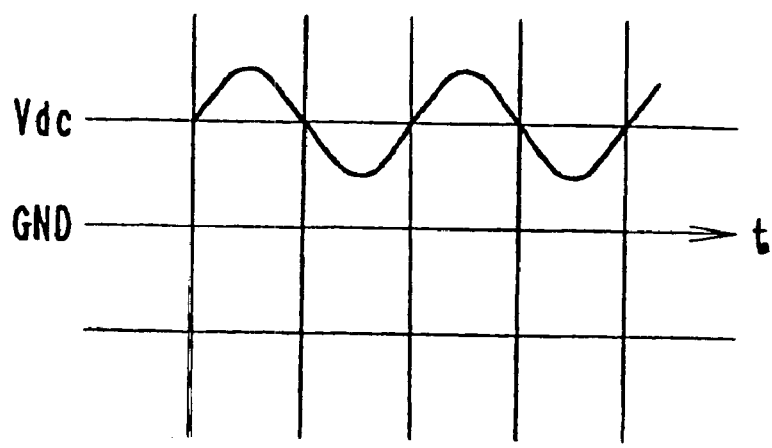
FIG. 2 is a time chart showing a drive signal supplied to a drive electrode of the first embodiment.

The drive electrode 13 is provided approximately along the Y-direction outside of the drive frame 11. The drive electrode 13 includes tine-shaped drive side fixed electrodes projecting in an interdigitated manner with the tines of the drive side movable electrode 26. The electrostatic capacitance between the drive electrode 13 and the drive side movable electrode 26 is periodically fluctuated by adding the voltage of the drive signal derived from the direct-current voltage component Vdc as a bias voltage and the alternating voltage as shown in FIG. 2 to oscillate the drive frame 11 in X-direction. Since the detecting frame 12 is connected to the drive frame 11 via the spring beams 35 through 38 extending in the X-direction, the drive frame 12 is oscillated in the X-direction with the oscillation of the drive frame 11 in the X-direction. The drive frame 11 and the detecting frame 12 are excited in the X-direction at resonant frequency by adding the drive signal. When the angular rate is added around the Z-axis when the drive frame 12 is oscillated in the X-direction in association with the drive frame 11, the detecting frame 12 undergoes an elliptical motion having an oscillation component in the Y-direction by the Coriolis force generated by the angular rate.

The first and the second driving direction displacement detecting electrodes 14a, 14b are respectively provided inside and outside of the drive frame 11 approximately along the Y-direction. Tine-shaped drive detecting side fixed electrodes projecting in an interdigitated manner with the tines of the drive detecting side movable electrode 27 and are formed on the driving direction displacement detecting electrodes 14a, 14b. The driving direction displacement detecting electrodes 14a, 14b detect the oscillation displacement of the drive frame 11 in the X-direction as the displacement signal. The displacement of the drive frame 11 in the X-direction is determined by the oscillation of the electrostatic capacitance generated between the driving direction displacement detecting electrodes 14a, 14b and the drive detecting side movable electrode 27 based on the oscillation of the drive frame 11 in the X-direction. That is, when the drive frame 11 is moved to the right side of FIG. 1, the electrostatic capacitance between the driving direction displacement detecting electrode 14a and the drive detecting side movable electrode 27 is reduced and at the same time the electrostatic capacitance between the driving direction displacement electrode 14b and the drive detecting side movable electrode 27 is increased. On the other hand, when the drive frame 11 is moved to the left side of FIG. 1, the electrostatic capacitance between the drive displacement detecting electrode 14a and the drive detecting side movable electrode 27 is increased and at the same time the electrostatic capacitance between the driving direction displacement detecting electrode 14b and the drive detecting side movable electrode 27 is reduced. Thus, the oscillation of the electrostatic capacitance, that is the displacement signal, of the first and the second driving direction displacement detecting electrodes 14a, 14b is inverted with respect to each other.

The angular rate detecting electrodes 15a, 15b are respectively provided in the space defined by the beams of the detecting frame 12 in spaced relation to each other and the opposing beams.

The angular rate detecting electrodes 15a, 15b detect the oscillation of the detecting frame 12 in the Y-direction by the oscillation of the electrostatic capacitance between the angular rate detecting electrodes 15a, 15b and the detecting frame 12 based on the oscillation of the detecting frame 12 in the Y-direction. That is, when the detecting frame 12 is moved upwardly in FIG. 1, the electrostatic capacitance between the detecting frame 12 and the angular rate detecting electrode 15a is reduced, and at the same time the electrostatic capacitance between the detecting frame 12 and the angular detecting electrode 15b is increased. On the other hand, when the detecting frame 12 is moved downwardly in FIG. 1, the electrostatic capacitance between the detecting frame 12 and the angular rate detecting electrode 15a is increased, and at the same time the electrostatic capacitance between the detecting frame 12 and the angular detecting electrode 15b is decreased. Accordingly, the oscillations of the electrostatic capacitance between the first and the second angular detecting electrodes 15a, 15b are opposed to each other.

The angular rate added around the Z-axis is detected from the oscillation of the detecting frame 12 in the Y-direction when the detecting frame 12 is oscillated in the X-direction in association with the drive frame 11.

The electrical aspects of the angular rate detection of the angular rate sensor will be explained as follows. As shown in FIG. 1, the angular rate sensor includes an actuator 40 and a detector 50.

Figure 3:
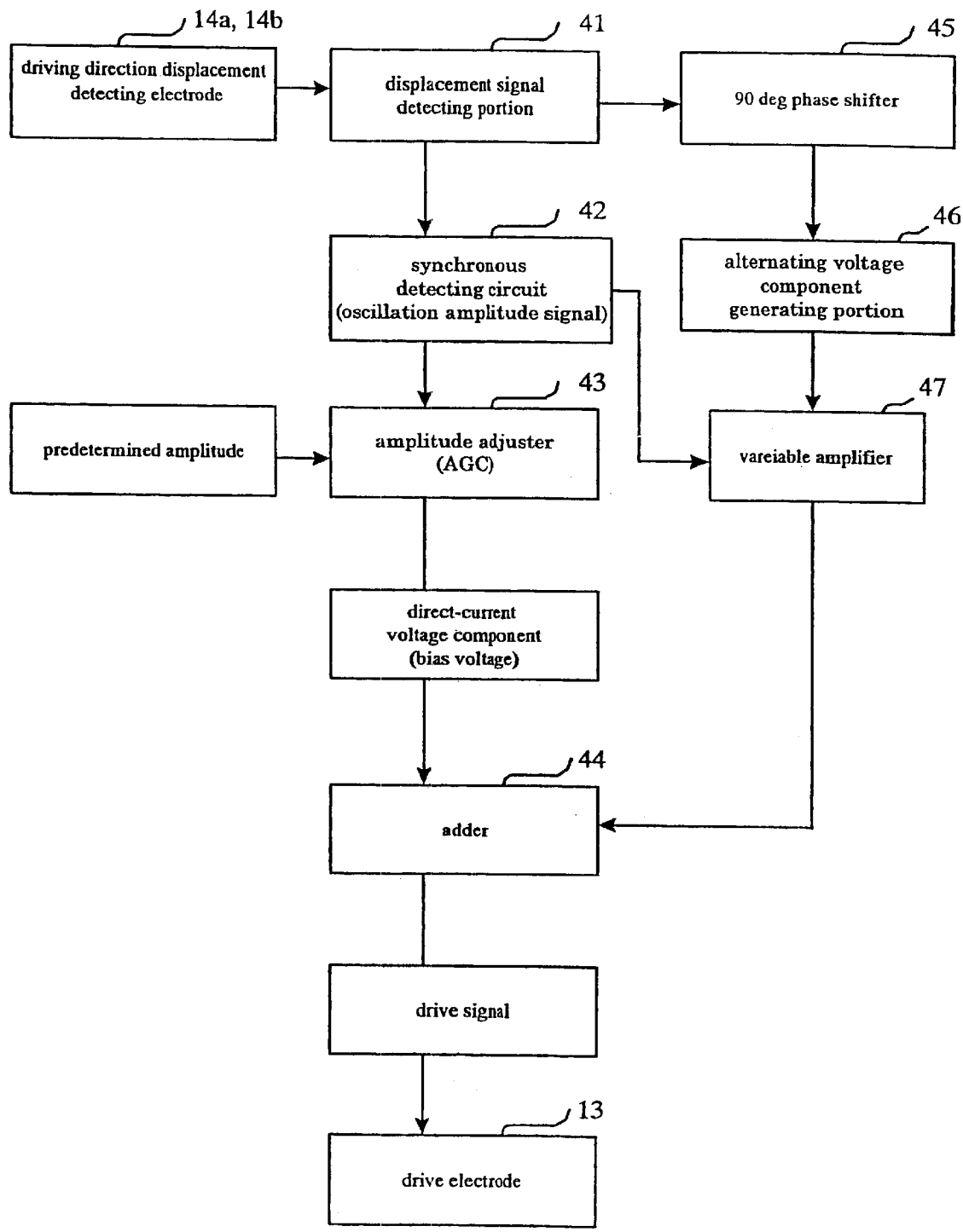
FIG. 3 is a schematic illustration of the angular rate sensor of the first embodiment.

The drive frame 11 and the detecting frame 12 are oscillated in the X-direction at resonant frequency by the actuator 40. The detailed structure of the actuator 40 is shown in FIG. 3. As shown in FIG. 3, each displacement signal from the driving direction displacement detecting electrodes 14a, 14b is outputted to a displacement signal detecting portion 41. Each displacement signal detected opposing each other is differentially amplified and a signal removed with the noise in phase based on mainly the drive signal is generated in the displacement signal detecting portion 41.

Figure 4:
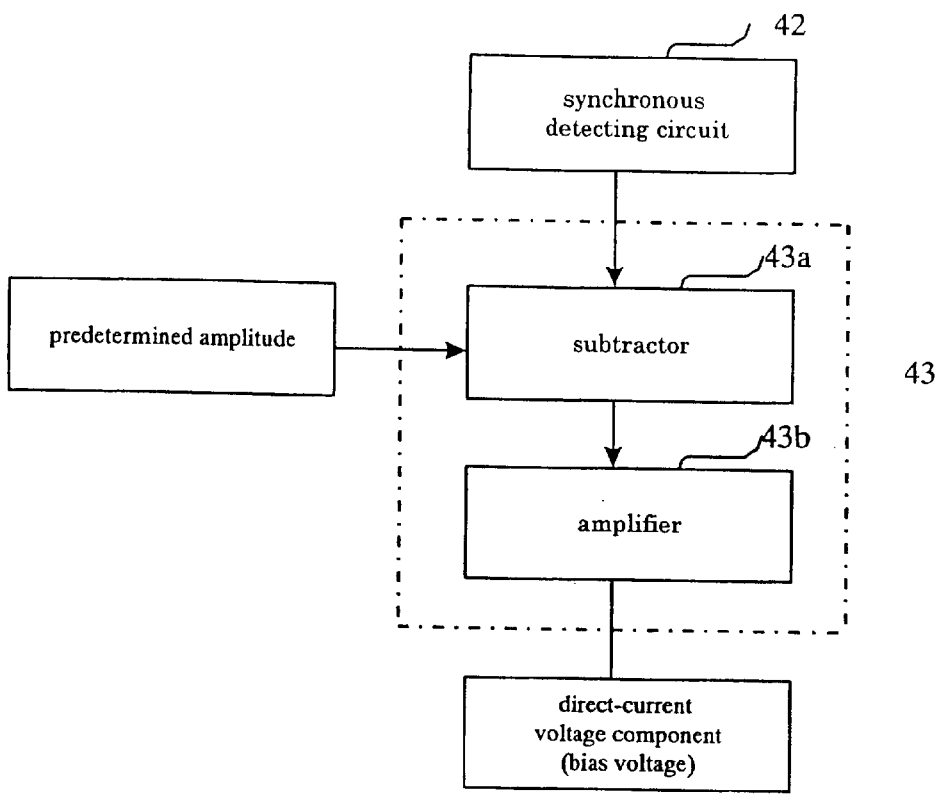
FIG. 4 is a schematic illustration of an amplitude adjuster of the first embodiment.

The displacement signal differentially amplified in the displacement signal detecting portion 41 is synchronously detected at a timing synchronized with the displacement in the X-direction in a synchronous detecting circuit 42 to be outputted as oscillation amplitude data to an amplitude adjuster 43 and to a variable amplifier 47 (which will be explained later). As shown in FIG. 4, the amplitude adjuster 43 includes a subtracter 43a and an amplifier 43b. The difference between the oscillation amplitude data and a predetermined amplitude value outputted to the amplitude adjuster 43 is calculated in the subtracter 43a. In the amplifier 43b, a signal proportional to the difference between the oscillation amplitude data and the predetermined amplitude value is generated as the direct-current voltage component Vdc of the drive signal. On one hand, the direct-current voltage component Vdc of the drive signal is generated to increase the potential between the drive electrode 13 and the electrode 26 on the drive frame 11 when the oscillation amplitude value is smaller than the predetermined amplitude value (incremental adjustment). On the other hand, the direct current voltage component Vdc of the drive signal is generated to decrease the potential between the drive electrode 13 and the drive frame 11 when the oscillation amplitude value is larger than the predetermined amplitude value (decrement adjustment). The direct current Vdc of the drive signal is adjusted to control the oscillation drive force of the drive frame 11 and the detecting frame 12 to maintain the constancy of oscillation amplitude of the drive frame 11 and the detecting frame 12 in the X-direction. The current component Vdc of the drive signal generated in this manner is outputted to an adder 44. A displacement signal performed with time integration and synchronously detected at timing synchronized to the displacement speed in the X-direction may be outputted to the amplitude adjuster 43 as the oscillation amplitude data.

A part of the displacement signal differentially amplified in the displacement signal detecting portion 41 is outputted to an alternating voltage component generating portion 46 after being phase-shifted by approximately 90 degrees via a 90 degree phase shifter 45. In the alternating voltage component generating portion 46, the phase of the alternating voltage component having the same frequency as the displacement signal is shifted by approximately 90 degrees to the displacement signal to generate the alternating voltage component having the constant amplitude which is to be transformed to the alternating voltage component of the drive signal. By shifting the phase of the alternating voltage component of the drive signal by approximately 90 degrees to the displacement signal, the drive frame 11 and the detecting frame 12 can be driven at the most effective resonant frequency point which makes the oscillation of the drive frame 11 and the detecting 20 frame 12 easy. The alternating voltage component of the drive signal generated in the aforementioned manner is outputted to the variable amplifier 47.

The variable amplifier 47 compares the oscillation amplitude data of the synchronous detecting circuit 42 to a predetermined amplitude value at a starting condition. The predetermined amplitude value at a starting condition is predetermined to be suitable for judging a characteristics at a starting condition when the oscillation amplitude of the drive frame 11 and the detecting frame 12 in the X-direction is small. The variable amplifier 47 selectively switches the amplification ratio of the alternating voltage component from the alternating voltage component generating portion 46 in accordance with the result of the comparison between the oscillation amplitude of the synchronous detecting circuit 42 and the predetermined amplitude value at a starting condition. That is, when the oscillation amplitude data of the synchronous detecting circuit 42 is smaller than the predetermined amplitude value at starting condition, it is judged to be at a starting condition to amplify the alternating voltage component from the alternating voltage component generating portion 46 by the larger side of the amplification ratio. On the other hand, when the oscillation amplitude data of the synchronous detecting circuit 42 is larger than the predetermined amplitude value at a starting condition, it is judged to be under normal operation to amplify the alternating voltage component from the alternating voltage component generating portion 46 by the smaller side of the amplification ratio. The alternating voltage component from the alternating voltage component generating portion 46 amplified by the amplification ratio selectively switched by the variable amplifier 47 is outputted to the adder 44 as the alternating voltage component of the drive signal having a constant amplitude determined as a first or second amplitude amplified in accordance with the selected amplification ratio. The amplitude of the alternating voltage component of the drive signal amplified by the smaller side of the amplification ratio (the first amplitude) is large enough to oscillate the drive frame 11 and the detecting frame 12 at the resonant frequency.

In the adder 44, the adjusted direct-current voltage component Vdc of the drive signal and the alternating voltage component of the drive signal having the constant amplitude are added to generate an incorporated drive signal. The incorporated drive signal generated in the foregoing manner is supplied to the drive electrode 13. By the oscillation of the electrostatic attraction generated between the drive frame 11 and the drive electrode 13 proportional to the second power of the drive signal, the drive frame 11 and the detecting frame 12 are oscillated in the X-direction. Thus, the oscillator is oscillated based on the larger electrostatic attraction caused by the direct-current voltage component Vdc which is adjusted to be increased or decreased and the alternating voltage component of the drive signal having the constant amplitude amplified by the larger side of amplification ratio to shorten a rise-time at a starting condition. The oscillator is oscillated to have constant oscillation amplitude based on the direct-current voltage component Vdc which is adjusted to be increased and decreased and the alternating voltage component of the drive signal having a constant amplitude amplified by the smaller side of amplification ratio during normal operation.

The detector 50 provided with first and second charge-voltage exchange circuits and a differential amplifier 53 detects the added angular rate around the Z-axis. The first and the second charge-voltage exchange circuits 51, 52 are respectively connected to the angular rate detecting electrodes 15a, 15b to generate an electric signal corresponding to the oscillation of the electrostatic capacitance between the angular rate detecting electrodes 15a, 15b with the detecting frame 12 being grounded. The electric signal is an alternating signal showing the level shift which is synchronized to the oscillation of the detecting frame 12 in the Y-direction.

Since the oscillations of the electrostatic capacitance of the angular rate detecting electrodes 15a, 15b are opposed to each other, the electric signals generated in the first and the second charge-voltage exchange circuits 51, 52 are opposed to each other.

The differential amplifier 53 connected to the charge-voltage exchange circuits 51, 52 differentially amplifies the electric signals generated opposed to each other in each charge-voltage exchange circuits 51, 52 to generate an angular rate signal in which noise is offset.

As mentioned above, the detecting frame 12 is oscillated in the Y-direction by adding the angular rate around the Z-axis during the detecting frame 12 being oscillated in association with the drive frame 11. In this case, the angular rate signal based on the oscillation of the detecting frame 12 in the Y-direction has a predetermined relationship with the added angular rate around the Z-axis. Accordingly, the added angular rate is detected from the angular rate signal.

A first effect of the first embodiment is as follows. According to the first embodiment, when the oscillation amplitude data of the synchronous detecting circuit 42 is smaller than the predetermined amplitude value at the starting condition, it is judged to be at the starting condition to amplify the alternating voltage component from the alternating voltage component generating portion 46 having a constant amplitude by the larger side of amplification ratio. Consequently, the actuator 40 generates the incorporated drive signal consisting of the direct-current voltage component Vdc (bias voltage) which is controlled to be increased or decreased based on the detected displacement signal and the alternating voltage component having the constant amplitude amplified by the larger side of the amplification ratio. Accordingly, by oscillating the drive frame 11 and the detecting frame 12 in the X-direction by the larger electrostatic attraction based on the drive signal, the rise-time of the oscillation amplitude at the starting condition can be shorten.

A second effect of the first embodiment is as follows. According to the first embodiment, when the oscillation amplitude data of the synchronous detecting circuit 42 is larger than the predetermined amplitude value at the starting condition, it is judged to be under normal operation to amplify the alternating voltage component from the alternating voltage component generating portion 46 having the constant amplitude by the smaller side of the amplification ratio. In consequence, the actuator 40 generates the incorporated drive signal consisting of the direct-current voltage component Vdc (bias voltage) which is increased or decreased based on the detected displacement signal and the alternating voltage component having the constant amplitude amplified by the smaller side of the amplification ratio. The oscillation of the drive frame 11 and the detecting frame 12 is controlled based on the aforementioned incorporated drive signal to adjust the constancy of the oscillation amplitude in the X-direction.

Accordingly, even when the Q factor of the drive frame 11 and the detecting frame 12 in the X-direction is changed by the change of the environmental temperature and the change of the drive frame 11 and the detecting frame 12 due to the passage of time, only the direct-current voltage component of the drive signal is controlled to be increased or decreased and the alternating voltage component is maintained to be constant. In consequence, even when the Q factor of the drive frame 11 and the detecting frame 12 in the X-direction is fluctuated by the change of the drive frame 11 and the detecting frame 12 due to the passage of time and the change of the environmental temperature, the amount of the noise mixed in the displacement detecting signal deriving from the alternating voltage component of the drive signal is kept stable. This can control the fluctuation of the gap of the detected output of the angular rate and the detected error of the oscillation condition of the drive frame 11 and the detecting frame 12.

A third effect of the first embodiment is as follows. According to the first embodiment, by comparing the actual oscillation amplitude data from the synchronous detecting circuit 42 and the predetermined amplitude value at the starting condition, the starting condition and the normal operation condition can be more precisely distinguished.

A fourth effect according to the first embodiment is as follows. In the first embodiment, the control for the increase and the decrease of the direct-current voltage component Vdc of the drive signal is conducted to be proportional to the difference between the oscillation amplitude data and the predetermined amplitude value of the drive frame 11 and the detecting frame 12 detected based on the displacement signal. Accordingly, the lag of the control for the oscillation driving force of the drive frame 11 and the detecting frame 12 can be minimized to provide a control with good responsibility to the drive frame 11 and the detecting frame 12.

A fifth effect according to the embodiment is as follows. In the first embodiment, the alternating voltage component of the drive signal is generated after being added with the phase differences by 90 degree. Accordingly, the drive frame 11 and the detecting frame 12 can be oscillated at the most effective resonant point.

Figure 5:
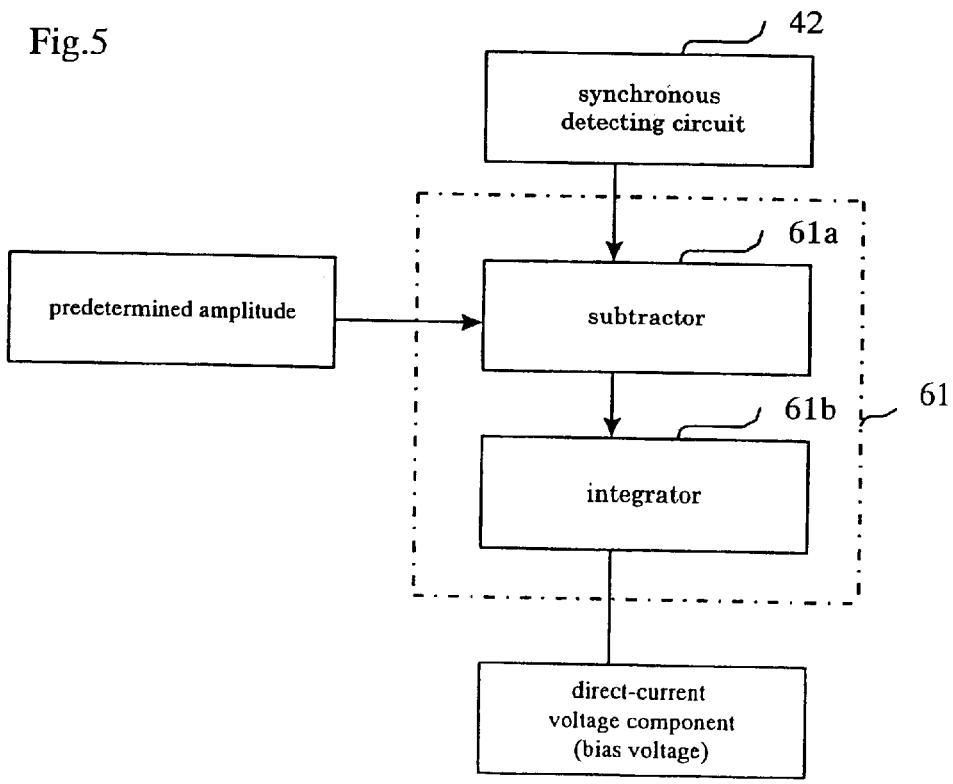
FIG. 5 is a schematic illustration of an example of another amplitude adjuster of the first embodiment.

Although the control of the increase and the decrease of the direct-current voltage component Vdc of the drive signal is conducted to be proportional to the difference between the oscillation amplitude data and the predetermined amplitude value of the drive frame 11 and the detecting frame 12 detected based on the displacement signal, other methods mentioned hereafter may be applied. The control of the increase and the decrease of the direct current Vdc of the drive signal may be conducted to be proportional to the value obtained by performing time integration of the difference between the oscillation amplitude data and the predetermined amplitude value of the drive frame 11 and the detecting frame 12 detected based on the displacement signal. That is, instead of using the amplitude adjuster 43 including the subtracter 43a and the amplifier 43b, an amplitude adjuster 61 including a subtracter 61a and an integrator 61b can be adopted as shown in FIG. 5. In this case, the difference between the oscillation amplitude data and the predetermined amplitude value outputted to the amplitude adjuster 61 is calculated in the subtracter 61a. In the integrator 61b, the signal proportional to the value obtained by performing time integration of the difference between the oscillation amplitude data and the predetermined amplitude value is generated as the direct-current voltage component Vdc of the drive signal. The direct-current voltage component Vdc of the drive signal is generated to increase the potential between the drive electrode 13 and the electrode 26 on the drive frame 11 when the oscillation amplitude data is smaller than the predetermined amplitude value (incremental adjustment). On the other hand, the direct-current voltage component Vdc of the drive signal is generated to decrease the potential between the drive electrode 13 and the electrode 26 of the drive frame 11 when the oscillation amplitude data is larger than the predetermined amplitude value (decremental adjustment).

Accordingly, the amplitude driving force of the drive frame 11 and the detecting frame 12 is controlled to maintain the constancy of the oscillation amplitude of the drive frame 11 and the detecting frame 12 in the X-direction.

When the direct current Vdc of the drive signal is generated, the following effect can be obtained. Highly accurate control of the drive frame 11 and the detecting frame 12 can be obtained to minimize the difference between the oscillation amplitude data and the predetermined amplitude value of the drive frame 11 and the detecting frame 12 to almost zero.

Figure 6:
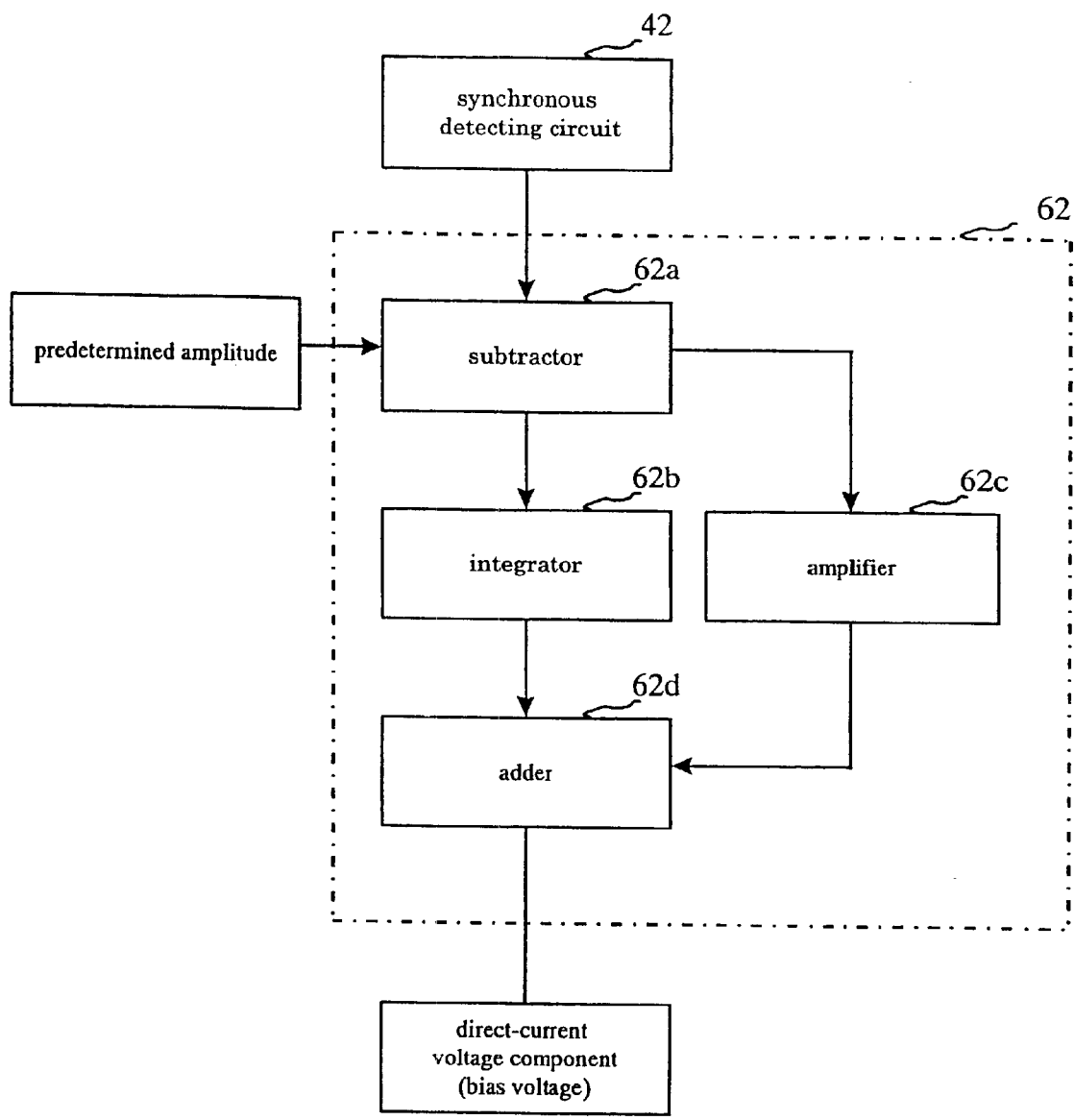
FIG. 6 is a schematic illustration of an example of still another amplitude adjuster of the first embodiment.

Further, the control of the increase and the decrease of the direct-current voltage component Vdc of the drive signal can be conducted to be proportional to the total of the value proportional to the difference between the oscillation amplitude data and the predetermined amplitude value and the value being performed with the time integration of the difference between the oscillation amplitude data and the predetermined amplitude value of the drive frame 11 and the detecting frame 12 detected based on the displacement signal. That is, in place of the amplitude adjuster 43 including the subtracter 43a and the integrator 43b, an amplitude adjuster 62 including a subtracter 62a, an integrator 62b, an amplifier 62c, and an adder 62d is adopted as shown in FIG. 6. In this case, the differences between the oscillation amplitude data and the predetermined oscillation amplitude data outputted to the amplitude adjuster 62 is calculated in the subtracter 62a. The signal proportional to the time integration of the difference between the oscillation amplitude data and the predetermined amplitude value is outputted to the adder 62d via the integrator 62b. The signal proportional to the difference between the oscillation amplitude data and the predetermined amplitude value is outputted to the adder 62d via the amplifier 62c. The addition of both signals via the integrator 62b and the amplifier 62c mixed in the adder 62d generates the direct-current voltage component Vdc of the drive signal. The direct-current voltage component Vdc of the drive signal is generated to increase the potential between the drive electrode 13 and the electrode 26 of the drive frame 11 when the oscillation amplitude data is smaller than the predetermined amplitude value (incremental adjustment). On the other hand, the direct-current voltage component Vdc of the drive signal is generated to decrease the potential between the drive electrode 13 and the electrode 26 of the drive frame 11 when the oscillation amplitude data is larger than the predetermined amplitude value (decremental adjustment). Accordingly, the amplitude driving force of the drive frame 11 and the detecting frame 12 is controlled to maintain the constancy of the oscillation amplitude of the drive frame 11 and the detecting frame 12 in the X-direction.

When the direct-current voltage component of the drive signal is generated in the foregoing manner, the lag for controlling the oscillation driving force of the drive frame 11 and the detecting frame 12 can be minimized. A control with high accuracy and good responsibility to the drive frame 11 and the detecting frame 12 can be obtained to minimize the difference between the oscillation amplitude data and the predetermined amplitude value of the drive frame 11 and the detecting frame 12.

Second Embodiment

Figure 7:
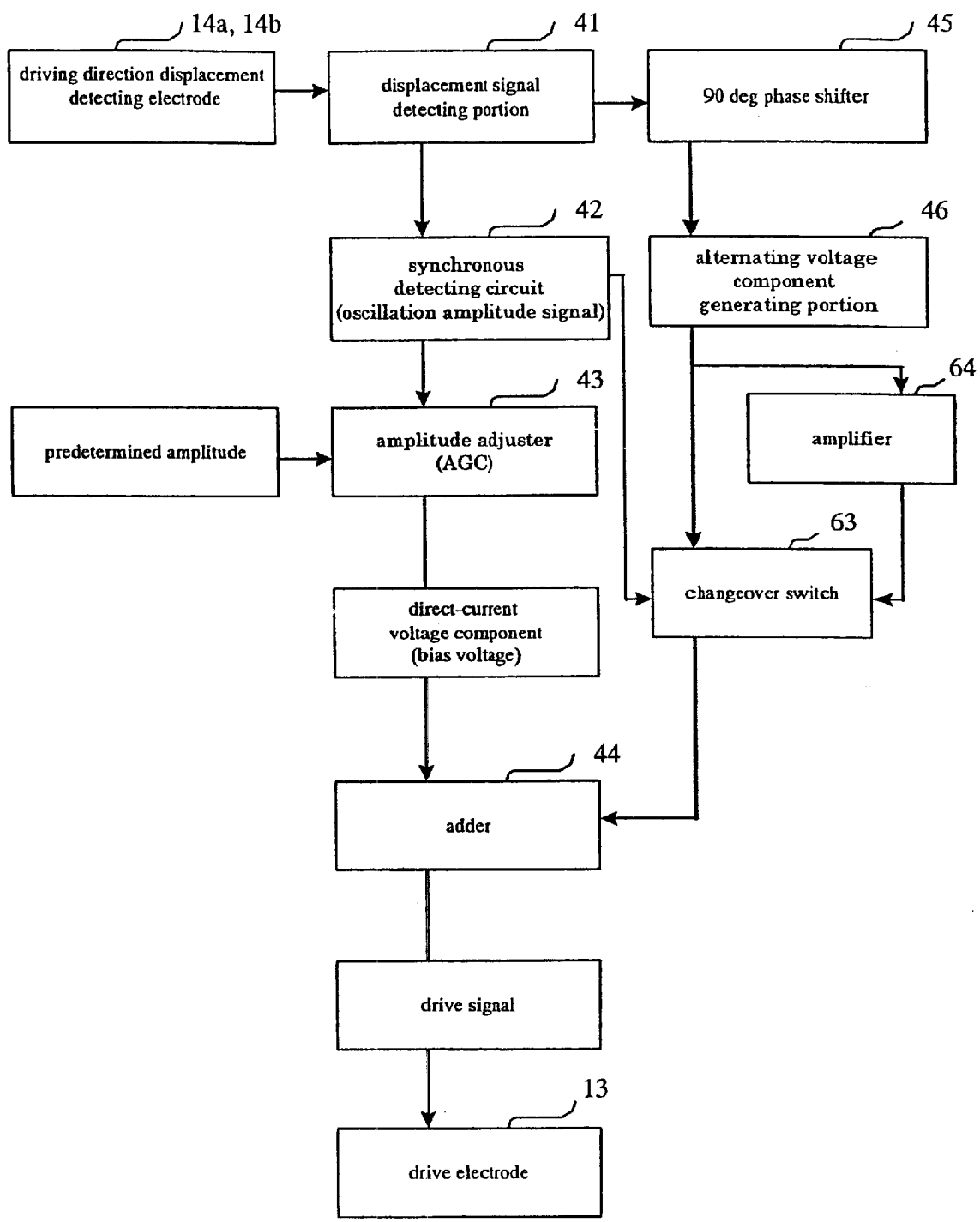
FIG. 7 is a schematic view showing an angular rate sensor used with a second embodiment of the present invention.

An angular rate sensor applied with the second embodiment of the present invention of the actuator for an oscillator will be explained as follows referring to FIG. 7. In FIG. 7, the actuator for an oscillator of the second embodiment includes a structure switching route for a signal using a changeover switch in place of the variable amplifier 47 of the first embodiment. Since the other components are the same as described in the first embodiment, the detailed explanations thereof are omitted from the description. One of the amplitude adjusters 61, 62 can be adopted in place of the amplitude adjuster 43.

As shown in FIG. 7, the oscillation amplitude data of the synchronous detecting circuit 42 is outputted to a changeover switch 63. An alternating voltage component having a constant amplitude and generated in the alternating voltage component generating portion 46 is diverted into two routes, a first signal route wherein the alternating voltage component is directly outputted to the changeover switch 63 and a second signal route wherein the alternating voltage component is outputted to the changeover switch 63 via an amplifier 64.

The changeover switch 63 compares the oscillation amplitude data of the synchronous detecting circuit 42 and the predetermined amplitude value at starting condition. The changeover switch 63 selectively switches the signal routes of the alternating voltage component having the constant amplitude from the alternating voltage generating portion 46 which is outputted to the adder 44 in accordance with the result of the comparison between the oscillation amplitude data of the synchronous detecting circuit 42 and the predetermined amplitude value at a starting condition. That is, when the oscillation amplitude data of the synchronous detecting circuit 42 is smaller than the predetermined amplitude value at a starting condition, it is judged to be at a starting condition to amplify the alternating voltage component from the alternating voltage component generating portion 46 via the amplifier 64. The alternating voltage component from the alternating voltage generating portion 46 amplified in the foregoing manner is outputted to the adder 44 as the alternating voltage component of the drive signal having a constant amplitude referred to as the second amplitude. On the other hand, when the oscillation amplitude data of the synchronous detecting circuit 42 is larger than the predetermined amplitude value at a starting condition, it is judged to be under normal operation to output the alternating voltage component from the alternating voltage component generating portion 46 to the adder 44 as the alternating voltage component of the drive signal having a constant amplitude referred to as the first amplitude. The amplitude of the alternating voltage component of the drive signal directly outputted from the alternating voltage component generating portion 46 to the adder 44, i.e the first amplitude, is large enough to oscillate the drive frame 11 and the detecting frame 12 at the resonant frequency.

In the adder 44, the adjusted direct-current voltage component Vdc of the drive signal and the alternating voltage component of the drive signal having the constant amplitude and processed in accordance with the selected signal route are added to generate an incorporated drive signal. The incorporated drive signal generated in the aforementioned manner is supplied to the drive electrode 13. The drive frame 11 and the detecting frame 12 are oscillated in the X-direction by the oscillation of the electrostatic attraction generated between the electrode 26 of the drive frame 11 and the electrode 13 proportional to the second power of the incorporated drive signal.

As described above, according to the second embodiment of the present invention, the same effects obtained in the first embodiment can be obtained.

Third Embodiment

Figure 8:
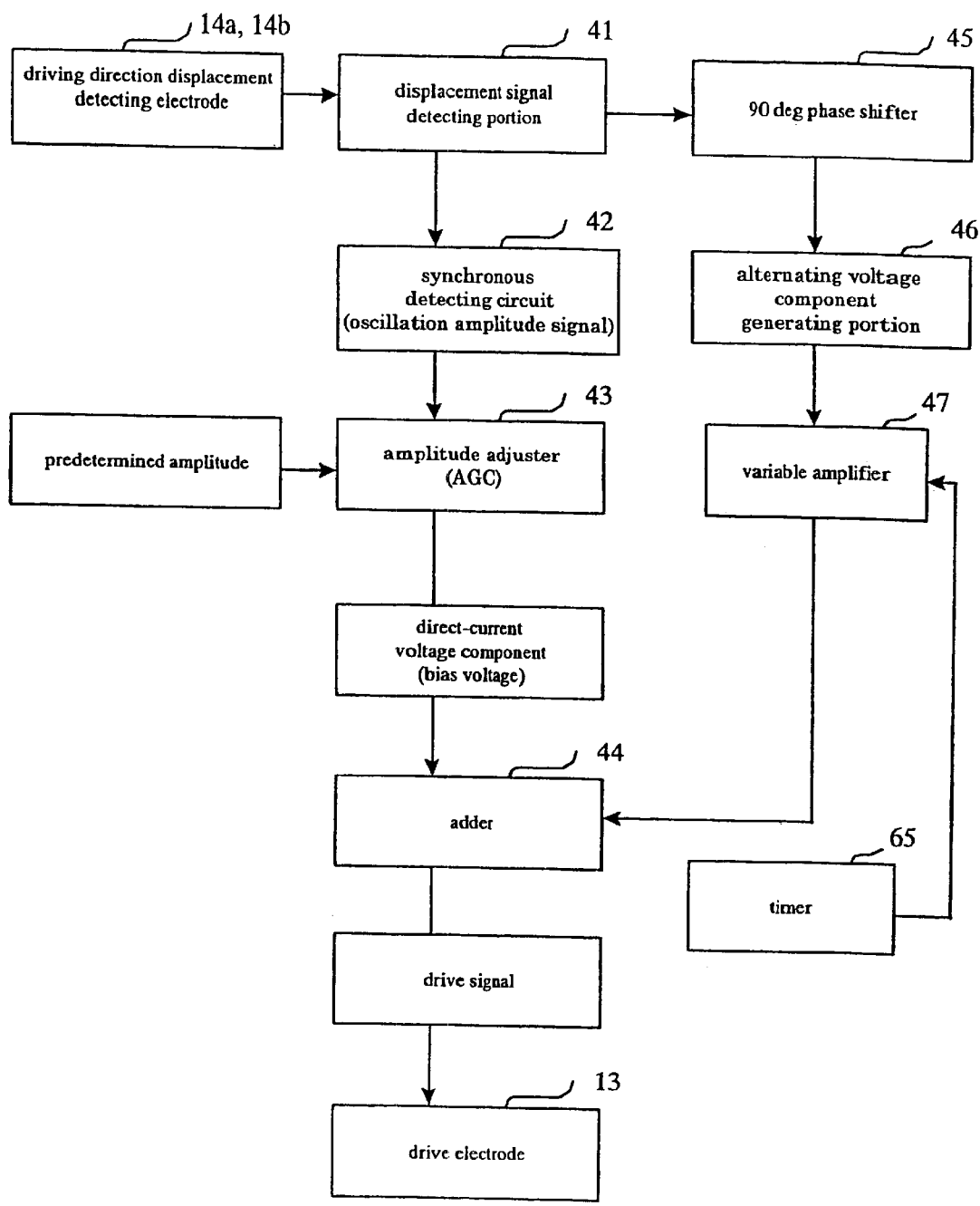
FIG. 8 is a schematic view showing an angular rate sensor used with a third embodiment of the present invention.

An angular rate sensor according to the third embodiment of the present invention of the actuator for an oscillator will be explained referring to FIG. 8. In the first embodiment, the oscillation amplitude data of the synchronous detecting circuit 42 and the predetermined amplitude value at a starting condition are compared in order to distinguish the starting condition and the normal operation condition. On the contrary, in the third embodiment, the starting condition and the normal operation condition are distinguished based on the passage of time after starting. Since the other components are the same as described in the first embodiment, the detailed explanation thereof are omitted from the description. One of the amplitude adjusters 61, 62 can be adopted in place of the amplitude adjuster 43.

In the third embodiment, a timer 65 is connected to the variable amplifier 47. The timer 65 is, for instance, comprised of an electrical resistor and an electrical capacitance to determine the passage of time after the starting by the time constants of resistance and capacitance. In accordance with the distinction of the starting condition and the normal operation condition based on the passage of time after starting, the variable amplifier 47 selectively switches the amplification ratio of the alternating voltage component having a constant amplitude from the alternating voltage component generating portion 46.

According to the third embodiment of the actuator for an oscillator, the following effect can be obtained in addition to the first, the second, the fourth, and the fifth effects of according to the first embodiment. In the third embodiment, the starting condition and the normal operation condition are distinguished based on the passage of time after starting determined by the timer 65. Thus, the circuit structure for distinguishing the starting condition and the normal operation can be simplified.

Fourth Embodiment

Figure 9:
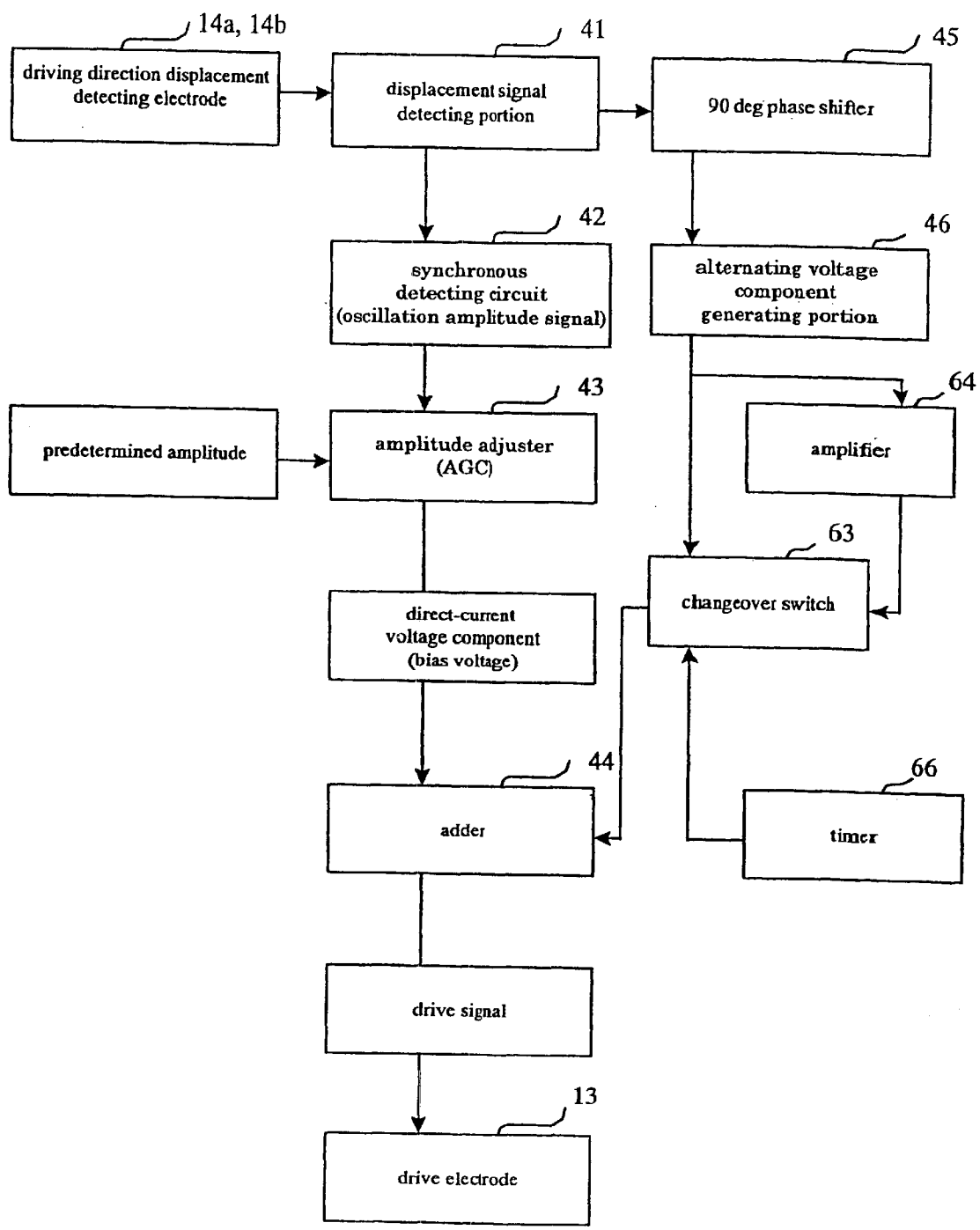
FIG. 9 is a schematic view showing an angular rate sensor used with a fourth embodiment of the present invention.

An angular rate sensor according to the fourth embodiment of the present invention of the actuator for an oscillator will be explained referring to FIG. 9. In the second embodiment, the oscillation amplitude data of the synchronous detecting circuit 42 and the predetermined amplitude value at starting condition were compared in order to distinguish the starting condition and the normal operation condition. On the contrary, in the fourth embodiment, the starting condition and the normal operation condition are distinguished based on the passage of time after starting, i.e., the initial stage of actuation. Since the other components are the same as described in the second embodiment, the detailed explanations thereof are omitted from the description. One of the amplitude adjusters 61, 62 can be adopted in place of the amplitude adjuster 43.

In the fourth embodiment, a timer 66 is connected to the changeover switch 63. The timer 66 is, for instance, comprised of an electrical resistor and an electrical capacitor to determine the passage of time after starting by the time constants of resistance and capacitance. In accordance with the distinction of the starting condition and the normal operation condition based on the passage of time after starting, the changeover switch 63 selectively switches the signal route of the alternating voltage component having constant amplitude from the alternating voltage component generating portion 46 and being outputted to the adder 44.

As described above, according to the fourth embodiment, the same effects as the third embodiment of the present invention can be obtained.

Fifth Embodiment

Figure 10:
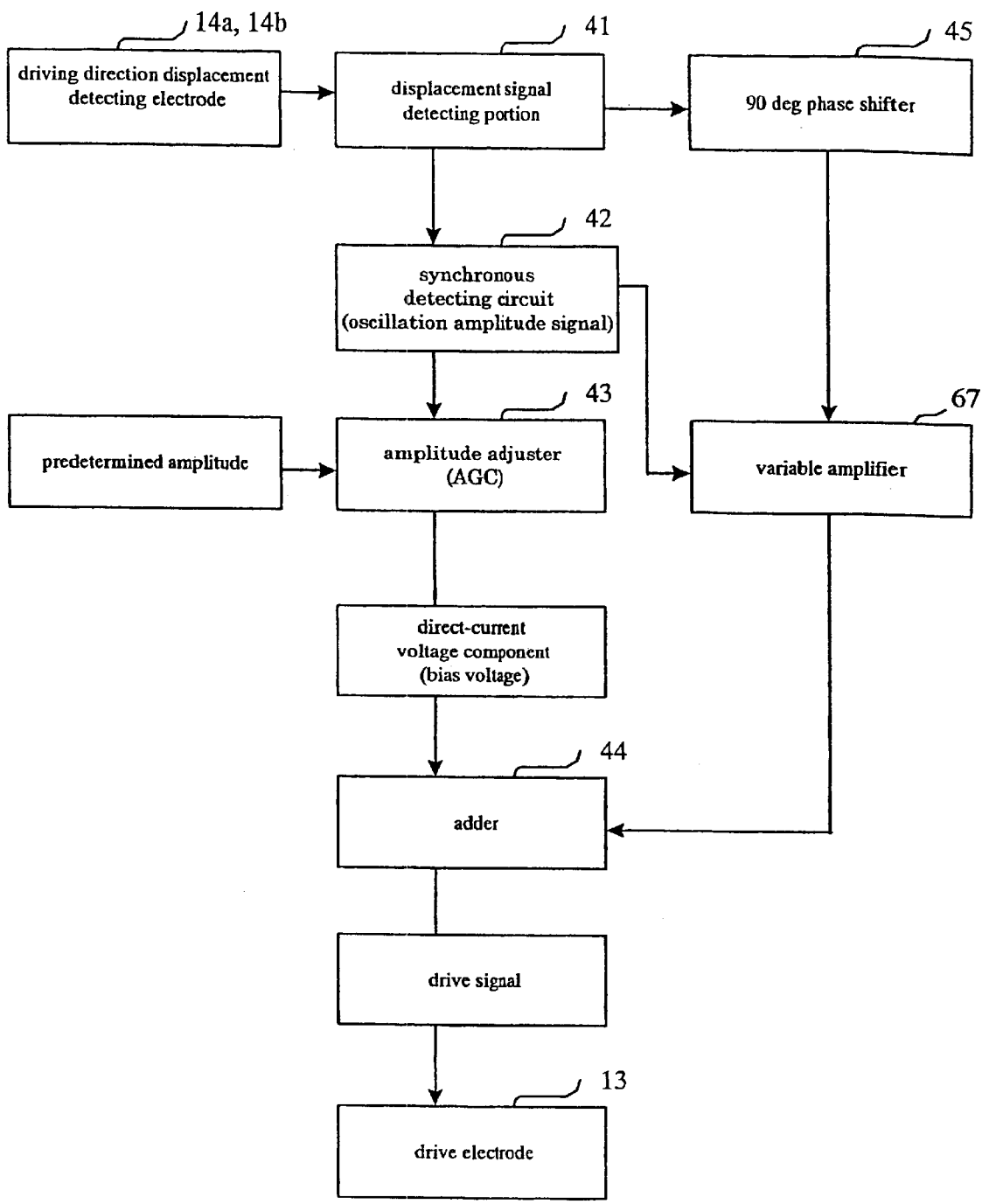
FIG. 10 is a schematic view showing an angular rate sensor used with a fifth embodiment of the present invention.
Figure 11:
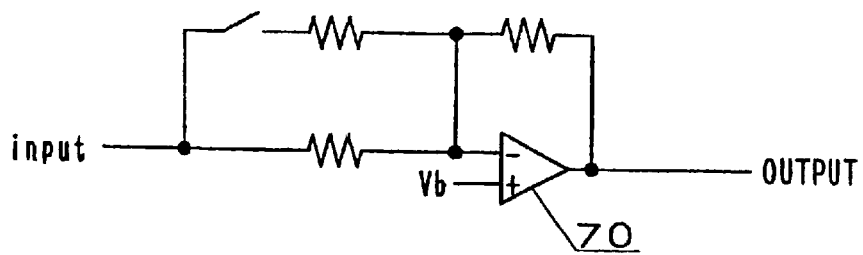
FIG. 11 is a schematic circuit diagram showing an example of a variable amplifier.
Figure 12:
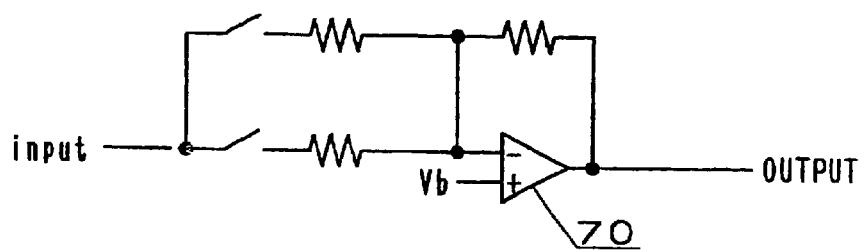
FIG. 12 is a schematic circuit diagram showing an example of a variable amplifier.
Figure 13:
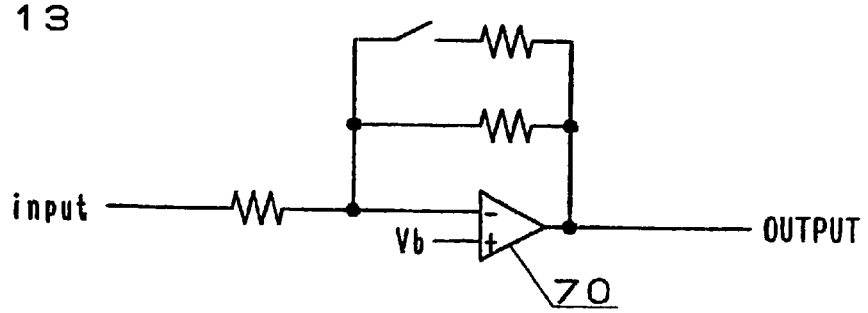
FIG. 13 is a schematic circuit diagram showing an example of a variable amplifier.
Figure 14:
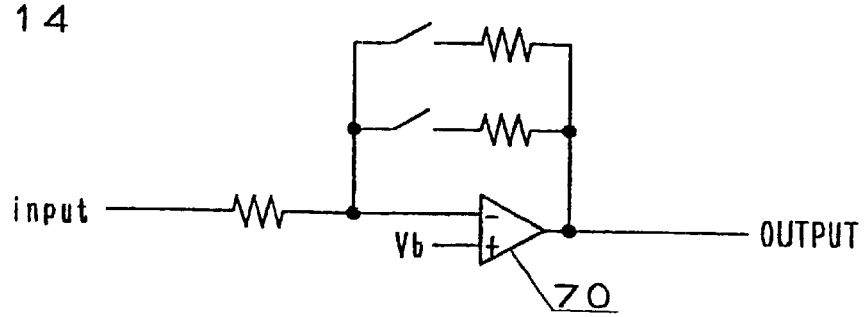
FIG. 14 is a schematic circuit diagram showing an example of a variable amplifier.
Figure 15:
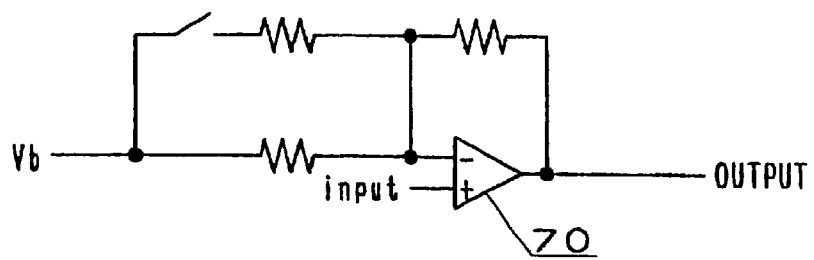
FIG. 15 is a schematic circuit diagram showing an example of a variable amplifier.
Figure 16:
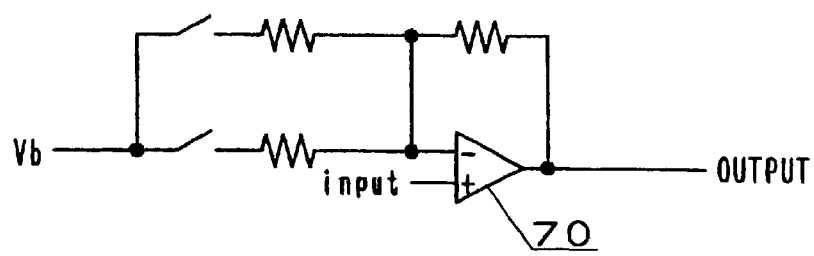
FIG. 16 is a schematic circuit diagram showing an example of a variable amplifier.
Figure 17:
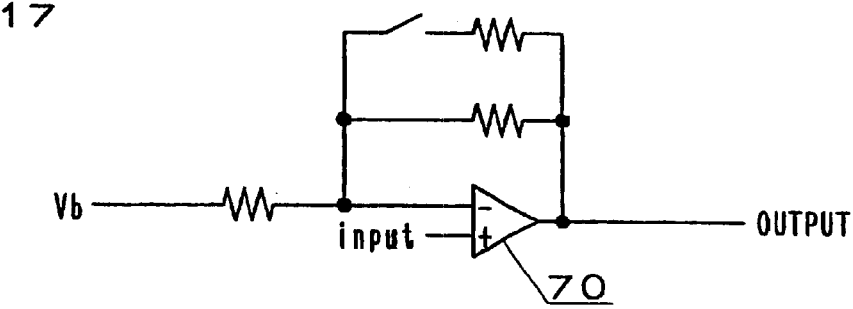
FIG. 17 is a schematic circuit diagram showing an example of a variable amplifier.
Figure 18:
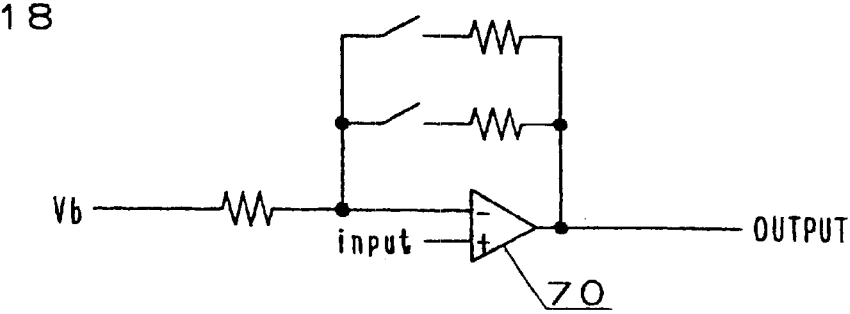
FIG. 18 is a schematic circuit diagram showing an example of a variable amplifier.
Figure 19:
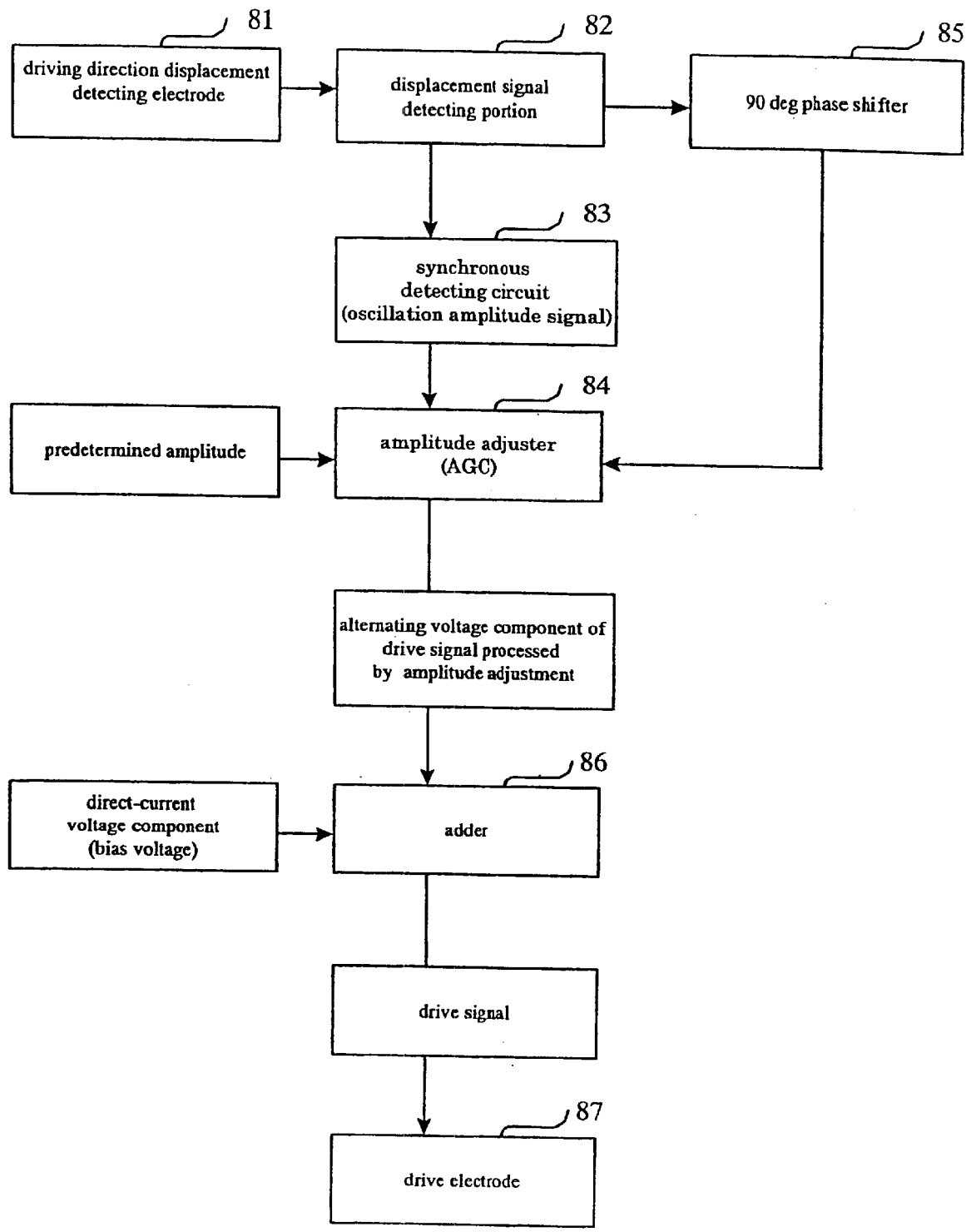
FIG. 19 is a schematic illustration showing conventional art relative to the present invention.
Figure 20:
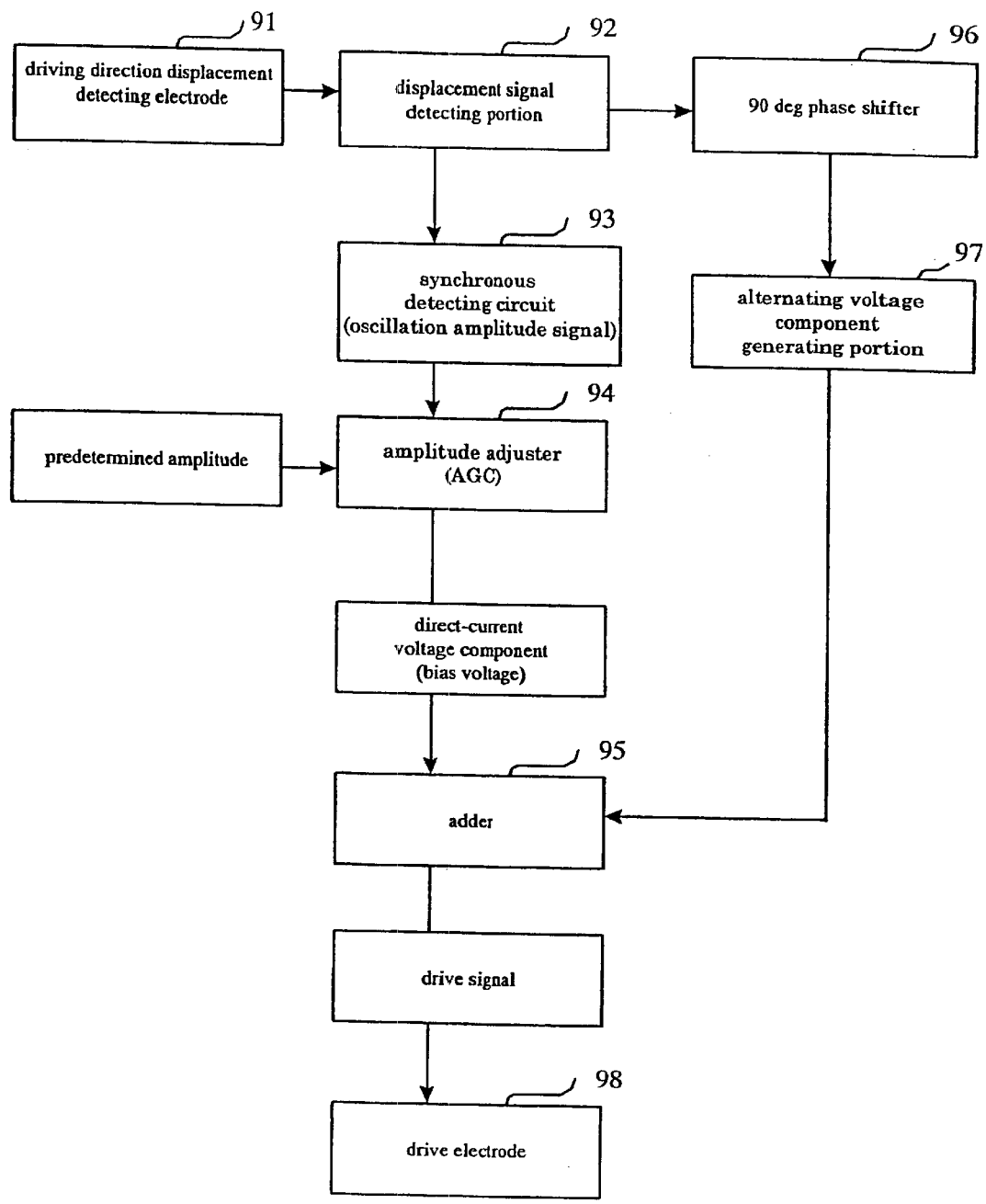
FIG. 20 is a schematic illustration showing additional conventional art relative to the present invention.

An angular rate sensor according to a fifth embodiment of the present invention of the actuator for an oscillator will be explained referring to FIG. 10. The actuator for an oscillator of the fifth embodiment includes another variable amplifier 67 in place of the variable amplifier 47 of the first embodiment. The alternating voltage component generating portion 46 of the first embodiment is omitted from the fifth embodiment. Since the other components are the same as described in the first embodiment, the detailed explanations thereof are omitted from the description. One of the amplitude adjusters 61, 62 can be adopted in place of the amplitude adjuster 43.

In the fifth embodiment, the alternating voltage component of the drive signal is generated by amplifying the displacement signal phase-shifted by approximately 90 degrees in the 90 deg phase shifter 45 via the variable amplifier 67. Comparable to the variable amplifier 47 in the first embodiment, the variable amplifier 67 selectively switches the amplification ratio of the alternating voltage component phase-shifted by approximately 90 degrees in the 90 degree phase shifter 45. That is, when the oscillation amplitude data of the synchronous detecting circuit 42 is smaller than the predetermined amplitude value at a starting condition, it is judged to be at a starting condition to amplify the displacement signal from the 90 degree phase shifter 45 by the larger side of the amplification ratio. On the contrary, when the oscillation amplitude data of the synchronous detecting circuit 42 is larger than the predetermined amplitude value at starting condition, it is judged to be at a normal operation to amplify the alternating voltage component from the 90 degree phase shifter 45 by the smaller side of the amplification ratio. The displacement signal or alternating voltage component from the 90 degree phase shifter 45 amplified by the amplification ratio determined by selective switching in the variable amplifier 67 is outputted to the adder 44 as the alternating voltage component of the drive signal. When the oscillation amplitude of the drive frame 11 and the detecting frame 12 is kept stable during the normal operation, the alternating voltage component of the drive signal having the constant amplitude is generated only by amplifying the displacement signal based on the oscillation of the drive frame 11 and the detecting frame 12. Thus, compared to the case of generating the alternating voltage component separately by the alternating voltage component generating portion 46, the circuit structure is simplified. The smaller side of the amplification ratio of the variable amplifier 67 is predetermined to have a loop gain larger than one (1) for oscillating the drive frame 11 and the detecting frame 12 at the resonant frequency.

According to the aforementioned fifth embodiment of the present invention, the following effects can be obtained in addition to the effects of the first embodiment.

According to the fifth embodiment, when the oscillation condition of the drive frame 11 and the detecting frame 12 is kept stable during the normal operation, the alternating voltage component of the drive signal having a constant amplitude is generated only by applying phase shifting and amplification of the displacement signal based on the oscillation of the drive frame 11 and the detecting frame 12. Thus, compared to the case of generating the alternating voltage component separately by the alternating voltage component generating portion 46, the circuit structure is simplified.

In the third embodiment of the present invention, the alternating voltage component of the drive signal is generated as a sine wave by amplifying the displacement detecting signal detected as a sine wave. Accordingly, the noise generation of the harmonic component mixed when the alternating voltage component of the drive signal is generated as a rectangular wave can be minimized.

It is to be understood that the present invention is not limited to the specific details of the embodiment described above. For example, another variable amplifier or another amplifier may be adopted and the alternating voltage component generating portion 46 may be omitted from the embodiments according to the second through the fourth embodiment.

In the variable amplifiers 47, 67 according to the first, the third, and the fifth embodiments, it is favorable that the larger side of the amplification ratio is set to be approximately ten times the smaller side of the amplification ratio.

It is favorable that the amplification ratio of the amplifier 64 according to the second and the fourth embodiments be set to be approximately ten times to those of the other embodiments.

As the variable amplifier of the first, the third, and the fifth embodiments, for instance, a negative feedback amplifier including an electrical resistor and an operational amplifier 70 may be applied. That is, for example, a variable amplifier structure can be structured by fixing the resistance value between a non-inverting input terminal and an output terminal and by variably changing the resistance value of the inverting input terminal side with the changeover switch (shown in FIGS. 11, 12, 15, 16). There is another example of the structure in which a variable amplifier is formed by fixing the resistance value of the inverting input terminal side and by variably changing the resistance value between the non-inverting input terminal and the output terminal with the changeover switch (shown in FIGS. 13, 14, 17, 18).

The alternating current voltage component of the drive signal of the first through the fourth embodiments can be either a sine wave or a rectangular wave.

Figure 21:
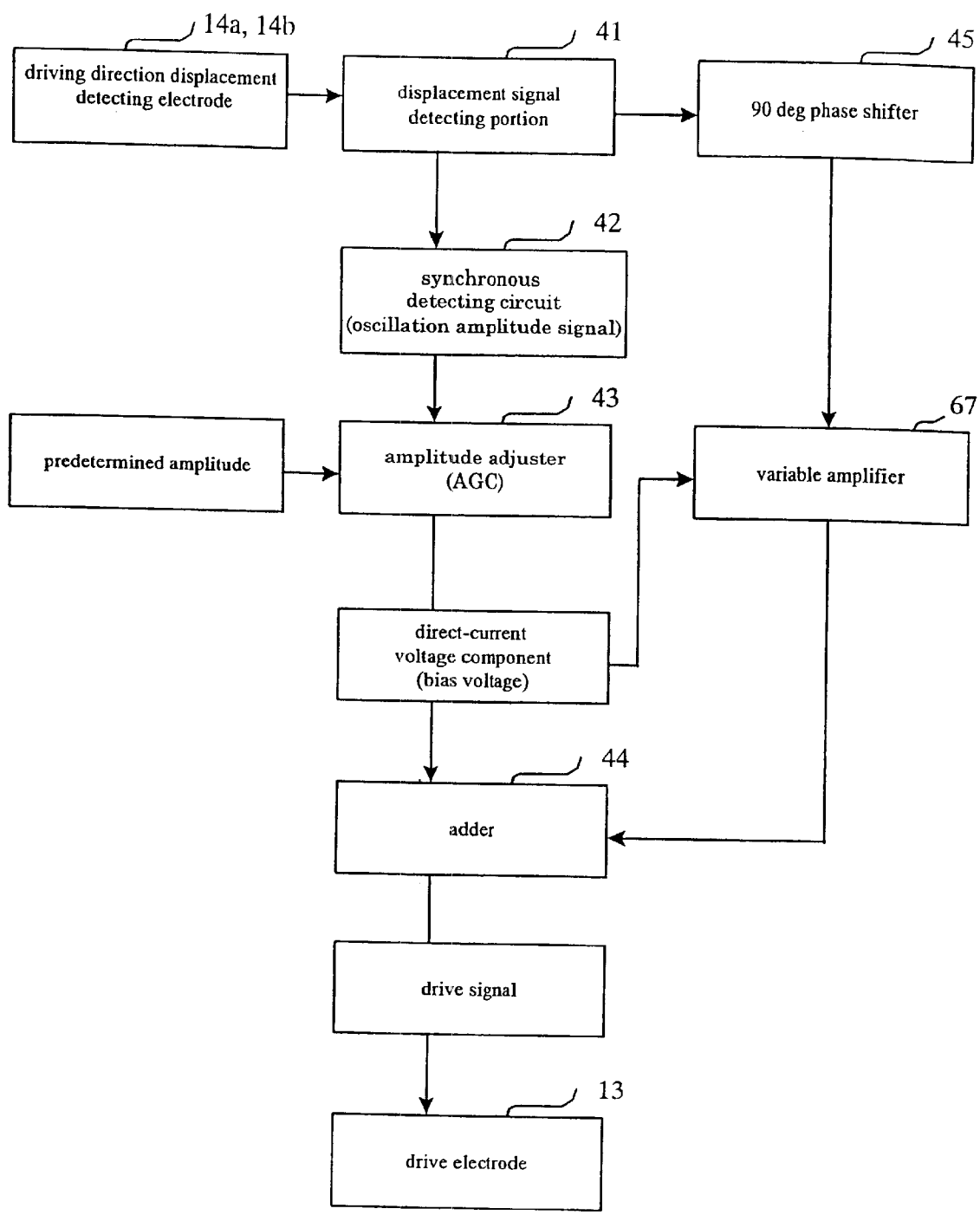
FIG. 21 is a variation of the schematic view of the fifth embodiment shown in FIG. 10.

As shown in FIG. 21, the direct-current voltage component Vdc may be used in place of the oscillation amplitude signal.

Although the 90 degree phase shifter 45 is adopted in each embodiment, a differentiator or an integrator may be adopted.

Although the phase shift is performed by approximately 90 degrees by the 90 degree phase shifter 45, the differentiator, or the integrator, the phase-shifting may be performed by any angle other than 90 degrees.

Although the phase of the signal transaction is divided into two phases, the starting condition and the normal operation, in each embodiment of the present invention, the signal transaction (the change of the amplification ratio, the switching of the signal route) performed in accordance with each condition, for instance, by subdividing the starting condition does not deviate the scope of the present invention.

The oscillation detecting structure 50 of the detecting frame 12 in the Y-direction adopted in foregoing respective embodiments is one example and other structures may be adopted.

The structures of the angular rate sensor adopted in the foregoing respective embodiments are examples of the invention and their structures are not limited thereto.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An actuator for an oscillator comprising:
an electrostatic driven oscillator;
an oscillator driving means for oscillating the electrostatic driven oscillator by outputting a drive signal thereto;
a displacement detecting means for detecting a displacement according to an oscillation of the electrostatic driven oscillator as a displacement signal;
an amplitude adjusting means for controlling the generation of the drive signal outputted from the oscillator driving means based on the detected displacement signal;
the amplitude adjusting means including an alternating voltage component generating means for generating an alternating voltage component of the drive signal having a first amplitude during normal operation and for generating the alternating voltage component of the drive signal having a second amplitude which is larger than the first amplitude during a starting operation and a direct-current voltage component generating means for generating a direct current voltage component of the drive signal controlled to be increased or decreased based on the detected displacement signal;
wherein an oscillation amplitude of the electrostatic driven oscillator is adjusted to be constant by controlling an oscillation force of the electrostatic driven oscillator based on an incorporated signal consisting of a direct-current voltage component and an alternating voltage component having a first amplitude at the normal operation; and
the oscillation amplitude of the electrostatic driven oscillator is increased by driving a larger oscillation drive force to the electrostatic driven oscillator based on the incorporated signal consisting of the direct-current voltage component and the alternating voltage component having a second amplitude at the starting operation.

2. The actuator for oscillator according to claim 1, wherein the alternating voltage component generating means is comprised of an alternating voltage component generating portion for generating the alternating voltage component of a predetermined amplitude and an amplifying portion for generating the alternating voltage component of the drive signal having the first amplitude and the alternating voltage component of the drive signal having the second amplitude by amplifying the alternating voltage component of the predetermined amplitude by a different amplification ratio in accordance with the distinction between the normal operation and the starting operation.

3. The actuator for oscillator according to claim 1, wherein the alternating voltage component generating means is comprised of a first signal route for generating the alternating voltage component of the drive signal having the first amplitude, a second signal route for generating the alternating voltage component of the drive signal having the second amplitude, and a switching portion for switching the first signal route and the second signal route in accordance with the distinction of the normal operation and the starting operation.

4. An actuator for oscillator comprising:
an oscillator driving means for oscillating an electrostatic driven oscillator by outputting a drive signal thereto;
a displacement detecting means for detecting a displacement according to an oscillation of the electrostatic driven oscillator as a displacement signal; and
an amplitude adjusting means for controlling the generation of the drive signal outputted from the oscillator driving means based on the detected displacement signal;
the amplitude adjusting means including an alternating voltage component generating means for generating an alternating voltage component of the drive signal having a constant amplitude by phase-shifting and amplifying the displacement signal by a first amplification ratio during a normal operation and for generating the alternating voltage component of the drive signal by amplifying the displacement signal by a second amplification ratio which is larger than the first amplification ratio during a starting operation and including a direct-current voltage component generating means for generating a direct-current voltage component of the drive signal controlled to be increased or decreased based on the detected displacement signal;
wherein an oscillation amplitude of the electrostatic driven oscillator is adjusted to be constant by controlling an oscillation drive force of the electrostatic driven oscillator based on an incorporated signal consisting of the direct-current voltage component and the alternating voltage component having a constant amplitude amplified by the first amplification ratio at the normal operation; and
wherein the oscillation amplitude of the electrostatic driven oscillator is increased by supplying a larger oscillation drive force relative to the electrostatic driven oscillator based on an incorporated drive signal consisting of the direct-current voltage component and the alternating voltage component amplified by the second amplification ratio during the starting operation.

5. The actuator for oscillator according to claim 1, wherein the normal operation and the starting operation are distinguished by the passage of time after starting.

6. The actuator for oscillator according to claim 1, wherein the normal operation and the starting operation are distinguished by the comparison between a predetermined amplitude during starting and the oscillation amplitude of the electrostatic driven oscillator detected based on the displacement signal.

7. The actuator for oscillator according to claim 1, wherein the normal operation and the starting operation are distinguished by the voltage of the direct-current voltage component.

8. The actuator for oscillator according to claim 1, wherein the normal operation and the starting operation are distinguished by the comparison between the direct-current voltage component and a predetermined voltage at the starting operation.

9. The actuator for oscillator according to claim 1, wherein the direct-current voltage component of the drive signal is controlled to be increased or decreased to be proportional to differences between a predetermined amplitude and the oscillation amplitude of the electrostatic driven oscillator detected based on the displacement signal.

10. The actuator for oscillator according to claim 1, wherein the direct-current voltage component of the drive signal is controlled to be increased or decreased to be proportional to a value performing time integration of differences between a predetermined amplitude and the oscillation amplitude of the electrostatic driven oscillator detected based on the displacement signal.

11. The actuator for oscillator according to claim 1, wherein the direct-current voltage component of the drive signal is controlled to be increased or decreased to be proportional to an addition of a value proportional to differences between a predetermined amplitude and the oscillation amplitude and a value performing time integration to differences between the predetermined amplitude and the oscillation amplitude of the electrostatic driven oscillator detected based on the displacement signal.

12. The actuator for oscillator according to claim 1, wherein the alternating voltage component of the drive signal is generated having a phase-contrast by approximately 90 degrees relative to the displacement signal.

* * * * *